Nov. 28, 1944.  J. S. GERBER ET AL  2,363,582
METHOD OF AND MEANS FOR STIRRING OR CIRCULATING MOLTEN
OR LIQUID MATERIALS OR MEDIUMS
Filed Oct. 26, 1942
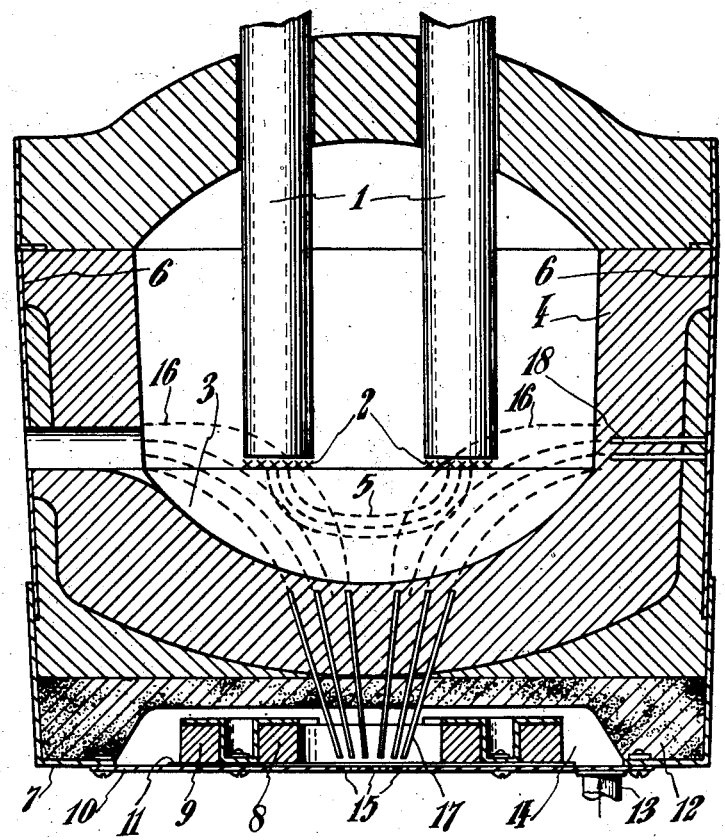
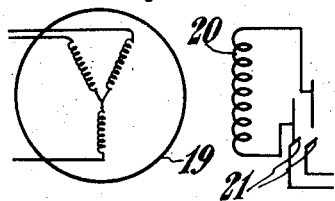
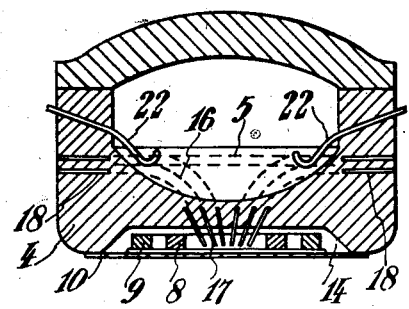
Inventors:
Jack Sydney Gerber,
William Duckett Redfern,
by Pierce + Scheffler,
Attorneys.

Patented Nov. 28, 1944

2,363,582

UNITED STATES PATENT OFFICE 2,363,582

METHOD OF AND MEANS FOR STIRRING OR CIRCULATING MOLTEN OR LIQUID MATERIALS OR MEDIUMS

Jack Sydney Gerber and William Duckett Redfern, Bradford, England

Application October 26, 1942, Serial No. 463,378
In Great Britain November 17, 1941

7 Claims. (Cl. 13—4)

This invention relates to the treatment of certain molten metals or other electrically conducting melts and especially to the treatment of molten ferrous and non-ferrous metals.

Metals are melted and/or refined or treated in furnaces, and in most cases the process is adapted to provide de-oxidation, refining, mixing, alloying, and rendering homogeneous the constituents. Various methods are adopted to obtain the desired results, e. g. rabbling, chemical or other agents are added to the metal when in a molten state, a forced air draught is introduced to the molten metal, or the molten metal in a furnace or mixer is caused to come into continuous contact with the slag on its surface.

A stirring or circulation of the bath and a continuous contact with the slag has been achieved in the electrical channel type induction furnace, and in the so-called high frequency or coreless induction furnaces which provide both heat and a continual circulation or turbulence of metal. A disadvantage with this type of furnace for refining is that usually the slag is not heated by induction and also the refractory linings rapidly deteriorate by the action of the slag, which is continually brought in contact therewith. Due to these disadvantages, it has been found in most cases impracticable to refine properly in these induction furnaces, but when achieved, a rapid and good refining and mixing action has been the result.

The main object of the present invention is to provide an improved method of achieving circulation in various types of furnaces or vessels containing molten metals or other electrically conducting melts.

According to this invention a method of treating molten metals or other electrically conducting melts is provided wherein at least one electric current is caused to flow through the molten metal in a furnace or vessel and at least one magnetic field is produced in the metal in addition to the magnetic field or fields produced by the electric current, the said fields co-acting in such a way that movement such as circulation or turbulence is produced in the molten metal or other melt.

The additional magnetic field is created through the influence of at least one electrical winding or coil which, in conjunction with the magnetic field or fields produced by the electrical current or currents led into the molten metal produces a circulation in the molten metal which can be varied in direction by varying the winding connections, or the phase relationship between the currents of the windings and the currents flowing in the melts, and in intensity and depth by varying the amount of the current in the winding (or windings), as well as by the variation of intensity of the electric currents flowing in the melts.

The invention also provides apparatus for treating molten metals or other electrically conducting melts which comprises a furnace or vessel provided with a refractory lining to contain the molten metal or other electrically conducting melt, means to supply at least one electric current to said furnace or vessel to pass through said molten metal or other melt, and at least one electrical winding with or without a magnetic core to produce at least one magnetic field in addition to the magnetic field produced by the current flowing through the melt, the arrangement being such that the said fields co-act to produce movement such as circulation or turbulence in the molten metal or other melt.

The magnetic field which co-acts with the field produced by the electric current flowing through the melt is produced by a winding (or windings) with or without a magnetic core or cores and/or a yoke or yokes which may be adapted to be cooled by air, water or oil or in some other manner. In some cases, depending upon the purpose to which the invention is applied, the position and type of winding and general working conditions, it may not be necessary to cool the windings. The apparatus for carrying the electrical current to the melt may comprise arcs, contacts or electrodes suitably insulated where necessary. An arrangement may be provided to adjust the phase relationship between the additional magnetic field and the other currents referred to above in the molten or liquid bath.

Referring now to the accompanying drawing in which embodiments of the invention are shown by way of example only:

Fig. 1 is a sectional view of a direct arc furnace with the invention applied thereto;

Fig. 2 is a diagrammatic view of means for varying the direction of circulation of the molten contents of the furnace;

Fig. 3 is a sectional view of a modified form of an indirect arc, air or open hearth furnace, or a mixer.

In applying the invention to furnaces for melting and/or refining metals, one or more windings is or are embedded within or located against or near the refractory hearth or lining or other furnace structure and the exact position of the winding or windings is determined by the shape, type and size of the furnace. If the furnace includes an outer metal shell then the winding or windings will be situated within it, and one particular form is shown in Fig. 1. In this case the furnace, which is generally of known construction, is of the direct arc type with two electrodes 1 for forming an arc 2 between themselves and the molten metal or other melt 3 in the hearth or lining 4, and providing the electrical current, indicated at 5. The outer metal shell 6 is continued down at 7 to form a support and enclosure for the flat windings 8, 9 which are carried by a detachable plate 10 from which they are insulated by a ring 11.

Hearths or linings made of acid, basic or neutral refractory materials, particularly magnesite or dolomite, conduct electricity at high temperatures. It may therefore be necessary to insulate the winding from the hearth and this may be done in any convenient manner. In Fig. 1 concrete or other material 12 passes over and round the windings to form a support for the hearth. When the refractory material adjacent the windings tends to become heated, then it will be desirable to cool the winding in any convenient manner and for this purpose air is introduced through inlet 13 to circulate through the chamber 14 to the central outlets 15. Alternatively, it may be deemed advisable to employ a tubular element to form a winding in which case the cooling agent could be passed through it as well as, or instead of, around it.

The electrical current fed to each winding is preferably alternating current, the voltage and amperage of which are determined, for example, by the size and shape of the furnace, the position of the coil and the degree of circulation or turbulence it has to create. This also applies to the electrodes 1 which provide the other currents flowing through the molten metal or other melt.

It will be seen that a magnetic field, indicated at 16, is created by the windings 8, 9 and in order to direct and strengthen its flow a core 17, which is shown as several rods, but may be strips, or core plates, of ferro-magnetic material, is associated with the windings. Further to direct and strengthen the magnetic flux, magnetic members 18 are attached or placed adjacent to the steel shell 6, i. e. at intervals around it, which is included in the magnetic field and the whole arrangement provides a comparatively short gap for the magnetic flux.

The magnetic field working in conjunction with the currents created by the arcs produces a circulation in the molten metal or other melt. The direction of such flow can be changed by varying the winding connections or the phase relationship between the currents of the windings and the electrodes. Thus the maximum flow with any particular magnetic field and any particular electrode current flowing through the melt occurs when the two are in phase. This can be effected by supplying the current for the electrodes from the secondary coil of a current transformer the primary coil of which is in series with the winding or windings providing the co-acting magnetic field. Particular means for varying the phase relationship are shown in Fig. 2 which comprise a three phase connected stator 19 with a single phase rotor 20 and two slip rings 21 connected to the windings 8, 9. The rotor is adapted to rotate through part of a revolution and may be held stationary in any particular position which gives the desired phase relationship. The resistance, choke or transformer may be used to regulate the value of the current in the winding or windings, for controlling the intensity and depth of the circulation in the molten metal or other melt, and the current to the electrodes 1 may be controlled in like manner.

Where there is no outer metal shell 6 the winding or windings 8, 9 can be mounted against, or let into, the refractory hearth or lining 4 in any convenient position or positions with or without a core (or cores) and/or yoke (or yokes).

Although the windings 8, 9 are shown below the metal line they may be arranged at or above and at any given distance from it so long as a magnetic field is created to co-act with the currents flowing through the melt and cause circulation.

It will be understood that the description given above with reference to the accompanying drawing is merely given by way of example and numerous modifications may be made. Thus, for example, instead of the magnetic members 18 being arranged as shown in the drawing they may consist of mild steel strips or laminated core the ends of which extend to the hearth and pass around the windings providing the magnetic field.

The invention deals primarily with arc furnaces of the direct type, but is also applicable to indirect arc, air, open hearth, and other furnaces whether of the stationary or movable type, having some form of fuel, gas, electric, or other heating means, but is not restricted thereto. It could be used with mixers or in connection with any molten material provided it is a conductor of electricity. The word "furnace" used herein must therefore be read where the context so admits as including all types of furnaces and mixers. Fig. 3 is intended to show an example of any of the above furnaces, or a mixer, wherein a pair of windings 8, 9, on a detachable plate 10 or other support, are located in a chamber 14 in the refractory hearth or lining 4. A core 17 and members 18, or their equivalent, are employed and a yoke (or yokes) may be provided for reducing the reluctance of the magnetic path. Electrodes 22 are provided to introduce the electrical currents into the melt. The electrodes may be introduced through the hearth from the sides or undersides, and may be cooled by water or other means.

This invention provides an improved method of circulation causing more rapid inter-action between slag and metal and faster and more complete refining. Also it provides improved cleansing, and in the case of ferrous metals better deoxidation, more complete and faster achievement of homogeneity with the avoidance of rabbling, as well as faster melting and more efficient expulsion of hydrogen. To avoid excessive damage to refractories or furnace linings, variation of direction of circulation can be obtained.

As a consequence of the rapid circulatory movement bringing metal into continuous contact with refining slag, the invention is particularly adapted to the manufacture and subsequent refining of ferro alloys. It is often necessary to remove silicon and/or carbon from these alloys with suitable reactive slags and these processes can be quickly and efficiently carried out by the circulation of the molten metal.

What we claim is:

1. A furnace comprising a receptacle for a melt, at least one electrode associated with said receptacle for passing electric current through said melt, at least one coil associated with said receptacle for producing a magnetic field in said melt, means for supplying synchronous alternating electric currents to said electrode and said coil and means for varying the phase relation between said alternating electric currents.

2. A furnace comprising a receptacle for a melt, at least one arc electrode associated with said receptacle for heating said melt by passing electric current through said melt, at least one coil associated with said receptacle for producing a magnetic field in said melt, means for supplying synchronous alternating electric currents to said arc electrode and said coil and means for varying the phase relation between said alternating electric currents.

3. A furnace comprising a receptacle for a melt, at least one electrode in said receptacle extending below the normal level of said melt in said receptacle for passing electric current through said melt, at least one coil associated with said receptacle for producing a magnetic field in said melt, means for supplying synchronous alternating electric currents to said electrode and said coil and means for varying the phase relation between said alternating electric currents.

4. A furnace comprising a receptacle for a melt, a plurality of electrodes in spaced relation in said receptacle for passing electric currents through said melt, a plurality of coils associated with said receptacle in spaced relation therewith for producing magnetic fields in said melt, means for supplying synchronous polyphase alternating electric currents to said electrodes and said coils and means for varying the phase relation between said polyphase alternating electric currents.

5. A furnace comprising a receptacle for a melt, a plurality of arc electrodes in spaced relation in said receptacle for heating said melt by passing electric current through said melt, a plurality of coils associated with said receptacle in spaced relation therewith for producing magnetic fields in said melt, means for supplying synchronous polyphase alternating electric currents to said arc electrodes and said coils and means for varying the phase relation between said polyphase alternating electric currents.

6. A furnace comprising a receptacle for a melt, a plurality of electrodes in spaced relation in said receptacle extending below the normal level of said melt in said receptacle for passing electric current through said melt, a plurality of coils associated with said receptacle in spaced relation for producing magnetic fields in said melt, means for supplying synchronous polyphase alternating electric currents to said electrodes and coils and means for varying the phase relation between said alternating electric currents.

7. The method of effecting and controlling the stirring of a melt in a furnace which consists in applying two separate synchronous alternating electric currents, one of which is caused to flow through the said melt while the other is passed through at least one coil associated with the melt to produce a magnetic field in the said melt and adjusting the phase relation between the said synchronous alternating electric currents to produce the desired degree and direction of stirring.

JACK SYDNEY GERBER.
WILLIAM DUCKETT REDFERN.